(12) United States Patent
Narayanaswamy et al.

(10) Patent No.: US 11,616,471 B2
(45) Date of Patent: Mar. 28, 2023

(54) SYSTEMS AND METHODS FOR CONNECTION TOPOLOGY OPTIMIZATION IN PHOTOVOLTAIC ARRAYS USING NEURAL NETWORKS

(71) Applicants: Vivek Sivaraman Narayanaswamy, Tempe, AZ (US); Andreas Spanias, Tempe, AZ (US); Rajapandian Ayyanar, Tempe, AZ (US); Cihan Tepedelenlioglu, Tempe, AZ (US)

(72) Inventors: Vivek Sivaraman Narayanaswamy, Tempe, AZ (US); Andreas Spanias, Tempe, AZ (US); Rajapandian Ayyanar, Tempe, AZ (US); Cihan Tepedelenlioglu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 623 days.

(21) Appl. No.: 16/797,281

(22) Filed: Feb. 21, 2020

(65) Prior Publication Data
US 2020/0274484 A1    Aug. 27, 2020

Related U.S. Application Data

(60) Provisional application No. 62/808,677, filed on Feb. 21, 2019.

(51) Int. Cl.
*H02S 50/00*    (2014.01)
*H02S 40/36*    (2014.01)
*G06N 3/08*    (2006.01)

(52) U.S. Cl.
CPC ............... *H02S 50/00* (2013.01); *G06N 3/08* (2013.01); *H02S 40/36* (2014.12); *Y04S 10/50* (2013.01)

(58) Field of Classification Search
CPC . H02S 50/00; H02S 40/36; G06N 3/08; Y04S 10/50
See application file for complete search history.

(56) References Cited

U.S. PATENT DOCUMENTS

| | | |
|---|---|---|
| 9,461,676 B2 | 10/2016 | Santucci et al. |
| 9,710,916 B2 | 7/2017 | Jayaraman et al. |

(Continued)

FOREIGN PATENT DOCUMENTS

| | | |
|---|---|---|
| WO | 2014144306 A1 | 9/2014 |
| WO | 2014144306 A9 | 9/2014 |

(Continued)

OTHER PUBLICATIONS

Braun, et al., Signal processing for fault detection in photovoltaic arrays, 2012 IEEE International Conference on, Acoustics, Speech and Signal Processing (ICASSP), pp. 1681-1684, Mar. 25, 2012.

(Continued)

*Primary Examiner* — Jared Fureman
*Assistant Examiner* — Duc M Pham
(74) *Attorney, Agent, or Firm* — Polsinelli PC

(57) ABSTRACT

Various embodiments for a connection topology reconfiguration technique for photovoltaic (PV) arrays to maximize power output under partial shading and fault conditions using neural networks are disclosed herein.

20 Claims, 8 Drawing Sheets
(4 of 8 Drawing Sheet(s) Filed in Color)

(56) References Cited

U.S. PATENT DOCUMENTS

| | | | |
|---|---|---|---|
| 9,875,428 | B2 | 1/2018 | Ramamurthy et al. |
| 10,097,005 | B2* | 10/2018 | Narla ............... H01L 31/02021 |
| 10,387,751 | B2 | 8/2019 | Braun et al. |
| 10,440,553 | B2 | 10/2019 | Zhang et al. |
| 2014/0278107 | A1* | 9/2014 | Kerrigan ................. G01W 1/18 702/3 |
| 2015/0019034 | A1* | 1/2015 | Gonatas .................. H02S 10/00 700/291 |
| 2018/0102733 | A1* | 4/2018 | Kakalia .................... H02S 50/00 |
| 2019/0108444 | A1 | 4/2019 | Song et al. |
| 2019/0384983 | A1 | 12/2019 | Katoch et al. |
| 2020/0226471 | A1 | 7/2020 | Shanthamallu et al. |
| 2020/0226472 | A1 | 7/2020 | Shanthamallu et al. |
| 2020/0358396 | A1 | 11/2020 | Rao et al. |

FOREIGN PATENT DOCUMENTS

| | | | |
|---|---|---|---|
| WO | 2014152919 | A1 | 9/2014 |
| WO | 2014152929 | A1 | 9/2014 |

OTHER PUBLICATIONS

Braun, et al., Signal Processing for Solar Array Monitoring, Fault Detection, and Optimization, Synthesis Lect. Power Electronics, J. Hudgins, Ed. Morgan & Claypool, vol. 3, Sep. 2012.

Braun, et al., Topology reconfiguration for optimization of photovoltaic array output, Elsevier Sustainable Energy, Grids and Networks (SEGAN), pp. 58-69, vol. 6, Jun. 2016.

Buddha, et al., Signal processing for photovoltaic applications, IEEE ESPA, vol. 12, No. 14, pp. 115-118, Jan. 2012.

Drif, et al., A new estimation method of irradiance on a partially shaded PV generator in grid connected photovoltaic system, Renew. Energy, vol. 33, No. 9, pp. 2048-2056, Feb. 2008.

El-Dein, et al., Optimal photovoltaic array reconfiguration to reduce partial shading losses, IEEE Trans. Sustain. Energy, 4(1), pp. 145-153, 2013.

Khondoker, et al., Photovoltaic Array Simulation and Fault Prediction via Multilayer Perceptron Models, Proc. IEEE IISA, Greece, 2018.

García, et al., Solar tracking PV plants in Navarra: A 10 MW assessment, Progress in photovoltaics: Research and Applications, 17(5), pp. 337-346, 2009.

Katoch, et al., Shading Prediction, Fault Detection, and Consensus Estimation for Solar Array Control, 1st IEEE International Conference on Industrial Cyber-Physical Systems (ICPS-2018), Saint Petersburg, Russia, May 2018.

Kaushika, et al., Energy yield simulations of interconnected solar PV arrays, IEEE Power Engineering Review, 22(8), pp. 62-62, 2002.

Krishna, et al., Reconfiguration stragies for reducing partial shading effects in photovoltaic arrays: State of the art, Solary Energy, vol. 182, pp. 429-452, 2019. [Online] Available: http://www.sciencedirect.com/science/article/pii/S0038092X19301835.

Liu, et al., Reconfiguration method to extract more power from partially shaded photovoltaic arrays with series-parallel topology, Energies, vol. 12, No. 8, p. 1439, 2019.

Liu, et al., Research on an adaptive solar photovoltaic array using shading degree model-based reconfiguration algorithm, In IEEE Control and Decision Conference (CCDC),pp. 2356-2360, May 2010.

Muniraju, et al., A Cyber-Physical Photovoltaic Array Monitoring and Control System, International Journal of Monitoring and Surveillance Technologies Research, vol., issue 3, 2017.

Narayanaswarmy, et al., Connection topology optimization in photovoltaic arrays using neural networks, in 2019 IEEE International Conference on Industrial Cyber Physical Systems (ICPS), May 2019, pp. 167-172.

Nguyen, et al., A reconfigurable solar photovoltaic array under shadow conditions, Proc. 23rd Annual IEEE Applied Power Electronics Conference and Exposition, pp. 980-986, 2008.

Pagliari, et al., Irradiance-driven partial reconfiguration of pv panels, in 2019 Design, Automation Test in Europe Conference Exhibition (DATE), Mar. 2019, pp. 884-889.

Pareek, et al., Optimal interconnections to address partial shading losses in solar photovoltaic arrays, Solary Energy, vol. 155, pp. 537-551, 2017.

Patel, et al., MATLAB-Based Modeling to Study the Effects of Partial Shading on PV Array Characteristics, IEEE Transactions on Energy Conversion, vol. 23, No. 1, pp. 302-310, Mar. 2008.

Patnaik, et al., Dynamic loss comparison between fixed-state and reconfigurable solar photovoltaic array, Photovoltaic Specialists Conference (PVSC), 2012 38th IEEE. IEEE, 2012.

Patnaik, et al., Reconfiguration strategy for optimization of solar photovoltaic array under non-uniform illumination conditions, In 37th IEEE.Photovoltaic Specialists Conference (PVSC), pp. (001859-001864), 2012.

Pedregosa, et al., Scikit-learn: Machine learning in Python, Journal of machine learning research , pp. 2825-2830, Oct. 2011.

Pendem, et al., Modeling, simulation and performance analysis of solar pv array configurations (series, series-parallel and honeycomb) to extract maximum power under partial shading conditions, Energy Reports, vol. 4, pp. 274-287, 2018. [Online] Available: http://www.sciencedirect.com/science/article/pii/S2352484717302378.

Picault, et al., Changing photovoltaic array interconnections to reduce mismatch losses: a case study, In 9th IEEE Environment and Electrical Engineering Conference (EEEIC), pp. 37-40, May 2010.

Picault, et al., Forecasting photovoltaic array power production subject to mismatch losses, Solar Energy 84.7 (2010): 1301-1309.

Rao, et al., A cyber-physical system approach for photovoltaic array monitoring and control, 2017 8th International Conference on Information, Intelligence, Systems Applications (IISA). IEEE, 2017.

Rao, et al., An 18 kW Solar Array Research Facility for Fault Detection Experiments, Melecon, Cyprus, Apr. 2016.

Rao, et al., Solar array fault detection using neural networks, in 2019 IEEE International Conference on Industrial Cyber Physical Systems (ICPS), May 2019, pp. 196-200.

Rohm mos datasheet, http://rohmfs.rohm.com/en/products/databook/applinote/ic/power/switching_regulator/power_loss_appli-e.pdf. 2016.

Romano, et al., Optimization of photovoltaic energy production through an efficient switching matrix, Journal of Sustainable Development of Energy, Water and Environment Systems, 1(3), pp. 227-236, 2013.

Salameh, et al., Optimum switching point for array reconfiguration controllers, Proc. IEEE 21st Photovoltaic Specialist Conf., 1990 (21st PVSEC), vol. 2, pp. 971-976, Kissimmee, FL, May 1990.

Salameh, et al., The effect of electrical array reconfiguration on the performance of a PV-powered volumetric water pump, IEEE Trans. Energy Convers., vol. 5, No. 4, pp. 653-658, Dec. 1990.

Shanthamallu, et al., A Brief Survey of Machine Learning Methods and their Sensor and IoT Applications, Proceedings 8th International Conference on Information, Intelligence, Systems and Applications (IEEE IISA 2017), Larnaca, Aug. 2017.

Spanias, Solar Energy Management as an Internet of Things (IoT) Application, Proceedings 8th International Conference on Information, Intelligence, Systems and Applications (IEEE IISA 2017), Larnaca, Aug. 2017.

Storey, et al., Improved optimization strategy for irradiance equalization in dynamic photovoltaic arrays IEEE Transactions on Power Electronics, 28(6), pp. 2946-2956, 2013.

Velasco-Quesada, et al., Electrical PV array reconfiguration strategy for energy extraction improvement in grid-connected PV systems, IEEE Transactions on Industrial Electronics, 56(11), pp. 4319-4331, 2009.

Widrow, et al. , Neural nets for adaptive filtering and adaptive pattern recognition, Computer, vol. 21, No. 3, pp. 25-39, Mar. 1988.

U.S. Appl. No. 16/901,961, filed Jun. 15, 2020, Jayasuriya et al.

(56) References Cited

OTHER PUBLICATIONS

U.S. Appl. No. 17/121,131, filed Dec. 14, 2020, Narayanaswamy et al.

* cited by examiner

|  | Predicted | | | |
| --- | --- | --- | --- | --- |
|  | Series Parallel | Bridge Link | Honey Comb | Total Cross Tied |
| Series Parallel | 132 | 10 | 32 | 66 |
| Bridge Link | 1 | 73 | 3 | 8 |
| Honey Comb | 8 | 2 | 108 | 15 |
| Total Cross Tied | 22 | 29 | 25 | 206 |

FIG. 7

| 901 | 901 | 901 | 901 |
|---|---|---|---|
| 901 | 901 | 446 | 446 |
| 901 | 446 | 901 | 446 |
| 446 | 446 | 446 | 901 |

Default – Series Parallel

FIG. 8A

| Before Reconfiguration (SP) | MPP : 1830.9W |
|---|---|
| After Reconfiguration (TCT) | MPP : 2124.3 W |
| % Power Increase : 16.0243 % | |

FIG. 8B

SYSTEMS AND METHODS FOR CONNECTION TOPOLOGY OPTIMIZATION IN PHOTOVOLTAIC ARRAYS USING NEURAL NETWORKS

CROSS-REFERENCE TO RELATED APPLICATIONS

This is a non-provisional application that claims benefit to U.S. provisional application Ser. No. 62/808,677 filed on Feb. 21, 2019 which is herein incorporated by reference in its entirety.

FIELD

The present disclosure generally relates to a connection topology reconfiguration technique for photovoltaic arrays; and in particular, a connection topology reconfiguration technique for photovoltaic arrays that utilizes machine learning.

BACKGROUND

With the growing demand in the production of renewable energy, photovoltaic (PV) systems have played an important role in meeting the energy requirements. However, the production of photovoltaic energy is affected by certain conditions such as partial shading, temperature, soil and wind. Among these, partial shading causes a significant reduction in power. On the other hand, the energy production can also be affected if a PV array system consists of faulty modules.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

FIG. 7 depicts a confusion matrix which provides the number of test examples that were correctly or incorrectly classified into their respective topology classes using the disclosed method.

FIGS. 8A and 8B are representative of an SP connected PV array with a partial irradiance profile and the percentage of power increase after reconfiguration to TCT, respectively.

Corresponding reference characters indicate corresponding elements among the view of the drawings. The headings used in the figures do not limit the scope of the claims.

DETAILED DESCRIPTION

A cyber-physical system (CPS) approach for optimizing the output power of photovoltaic (PV) energy systems is disclosed herein. In particular, a novel connection topology reconfiguration strategy for PV arrays to maximize power output under partial shading conditions using neural networks is disclosed. Some connection topologies, namely series parallel (SP), total cross tied (TCT), honeycomb (HC), and bridge link (BL) produce different maximum power points (MPP), depending upon an irradiance/shading profile of the panels. The connection topology of the PV array that provides the maximum power output is chosen using a multi-layer perceptron.

Figure 1:
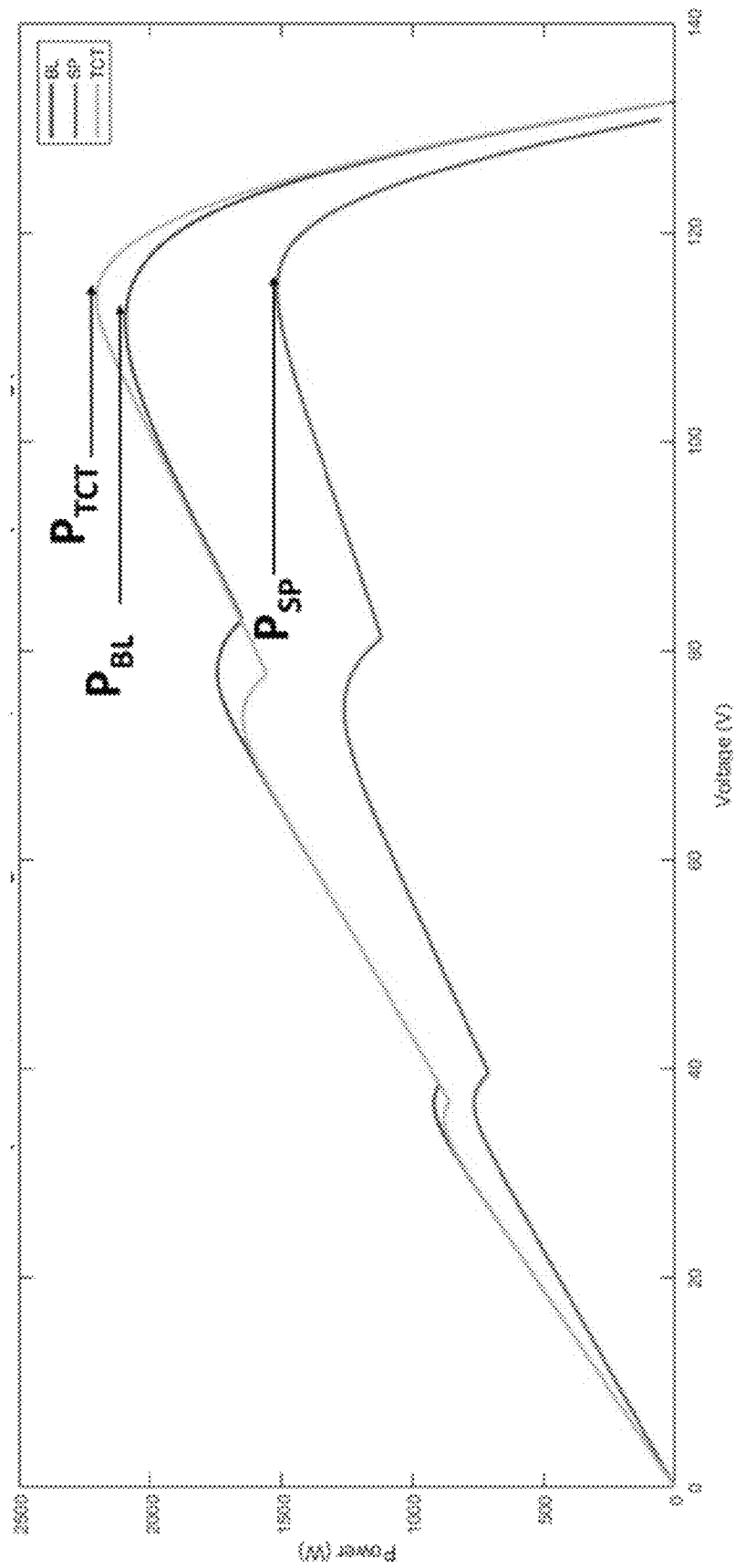
FIG. 1 shows a graphical comparison showing the maximum power curves for Series-Parallel (SP), Bridge Link (BL) and Total Cross Tied (TCT) configurations for a particular shading configuration.

A change in the electrical connections under partial shading or faulty conditions can be leveraged to improve the overall electrical power produced by the PV system by a considerable margin, thereby facilitating the need for connection topology optimization. FIG. 1 illustrates a set of power vs. voltage curves for a partial shading profile for three different topologies being considered. It can be clearly understood that there is a substantial difference in the power produced when the PV array is reconfigured.

Figure 2B:
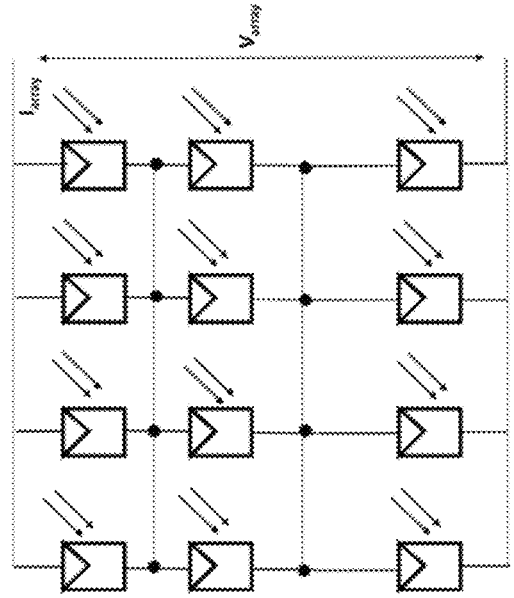
FIGS. 2A, 2B, 2C, and 2D depict Series-Parallel, Total Cross Tied, Bridge Link and Honeycomb configurations, respectively, for photovoltaic array connection topologies.
Figure 2D:
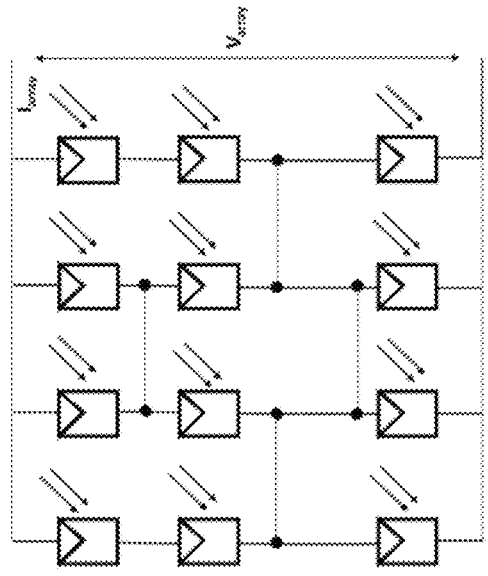
Figure 2A:
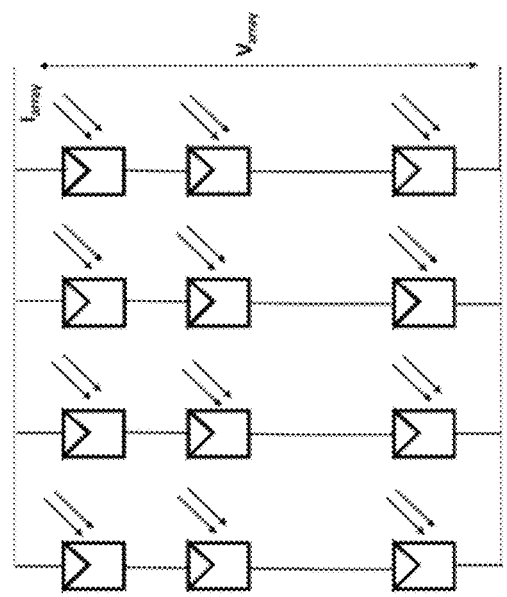
Figure 2C:
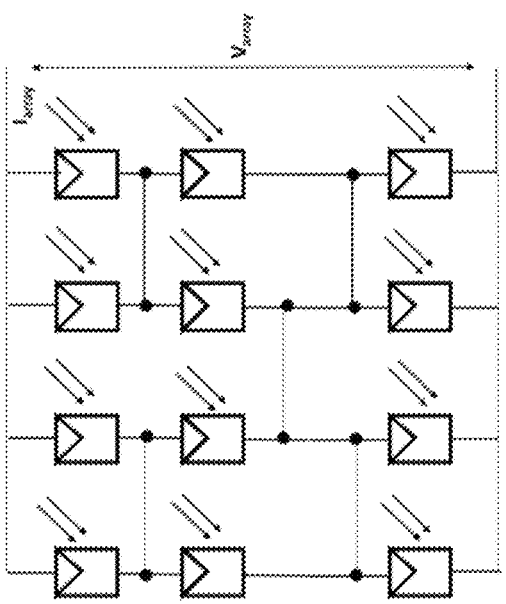

Off-the-shelf photovoltaic arrays are generally connected in a series-parallel (SP) topology, where individual PV panels are connected in series to form a PV string and several strings are connected in parallel to form the array. A typical SP topology is illustrated in FIG. 2A. In addition to the conventional SP topology, PV modules can also be connected in a cross tied manner which, although requires additional connections between the modules, provides better performance than SP under certain conditions. The three types of cross tied topologies considered in this disclosure are namely the total cross tied (TCT), bridge link (BL) and Honeycomb (HC) configurations. In the TCT topology shown in FIG. 2B, every PV module is connected in series and parallel with the other modules. The BL topology as shown in FIG. 2C consists of half as many interconnections as the TCT topology. The HC topology is illustrated in FIG. 2D. All the topologies considered namely SP, TCT, HC and BL behave similarly under perfect illumination and the generated array power is the same for all three topologies in this case. In other words, the maximum power point (PMP) and the corresponding voltage (VMP) are similar under no shading. However, when there are electrical mismatches and partial shading, one of the topologies can outperform the others.

With advances in signal processing and machine learning techniques used with CPS PV systems, data from the PV panels can be effectively used to provide improved monitoring, control and power output optimization. The CPS PV system disclosed herein includes 'smart-monitoring devices' (SMDs) that are connected on every PV panel to measure and transmit data wirelessly to a computer server. This allows panels to communicate with the neighboring panels using the SMDs. The SMDs also have capabilities like that of switching devices which can be used to modify the electrical connection between two neighboring panels. As stated earlier, a change in the electrical connections under partial shading conditions can be leveraged to improve the overall electrical power produced by the CPS PV system by a considerable margin, thereby facilitating the need for connection topology optimization. There is a significant difference in the power when the array operates under TCT topology which provides the maximum power in this case when compared to SP topology. An average of 4-5% improvement in overall power output is reported when the array is reconfigured under certain conditions.

Figure 3:
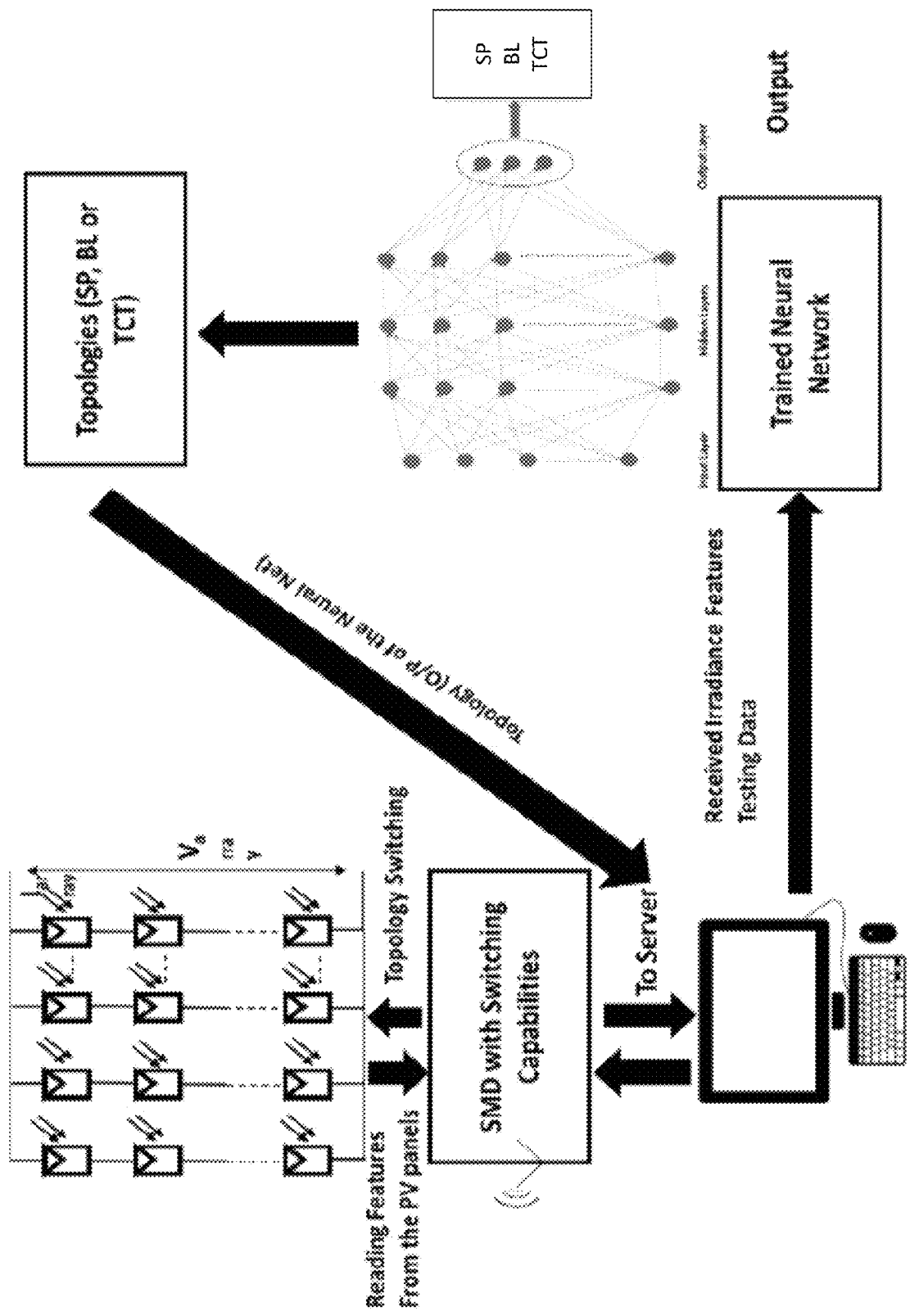
FIG. 3 shows a graphical system-level overview showing the disclosed process.

In order to provide a generalizable and robust automatic array reconfiguration system into the SP, TCT, HC or BL topologies, a model that can learn different patterns of the irradiance profiles (i.e. partial shading of the panels) and predict the optimum configuration is required. Once the machine learning model is trained on a significantly large set of training data, it can accurately classify an arbitrary partial shading irradiance profile to that particular configuration which can maximize the output power. The use of a machine learning model for this application produces an end to end system which learns a function to map irradiances to the optimal reconfiguration strategy. This also allows the leveraging of data from every PV panel. A connection topology optimization algorithm for PV arrays is disclosed herein to change the configuration amongst series-parallel (SP), total cross tied (TCT), honeycomb (HC) and bridge link (BL) topologies using a two-layer neural network architecture. FIG. 3 describes a system level approach of the disclosed algorithm. Here, as illustrated, the irradiance per panel is measured by the SMD and transmitted to a local server where it is fed as inputs to the neural network which predicts the required topology. The topology chosen is communicated to the server which in turn initiates the SMDs to perform topology reconnection.

The enormous growth in supervised machine learning in the past decade can be attributed to the success of several neural network architectures. The neural network architecture disclosed herein is trained using the irradiance feature on each of the panels of the PV array. The labels, which are used essentially to optimize the weights, are the particular configuration a PV array system must be reconfigured to in order to produce maximum power output. The determination of the maximum power of the three different topologies considered was performed using MATLAB-Simulink. The neural network training was performed using scikit-learn and keras package in Python. In comparison with the existing work performed in this area, the method disclosed herein is capable of implementation without new PV panels and provides significant improvement.

Synthetic Data Generation and Pre-Processing

Figure 4:
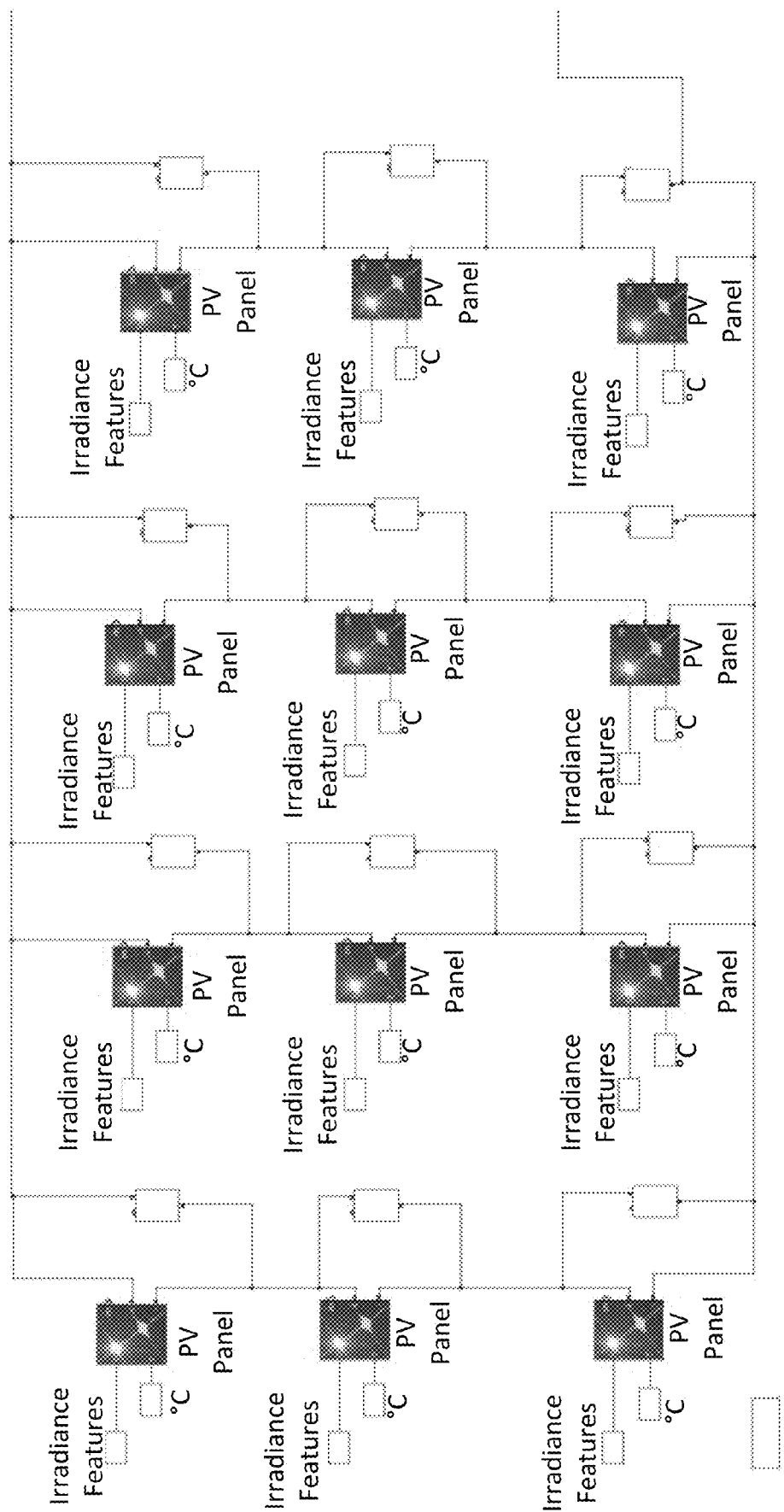
FIG. 4 shows a MATLAB Simulink 12-panel SP PV array model that was used during the experimentation process.

In the present system, data has been generated through simulated models. FIG. 4 shows the MATLAB-Simulink SP PV array model which was used in the experiments. In FIG. 4, the inputs to the PV module ('blue') are irradiance and cell temperature. Similar to FIG. 4, Simulink models for TCT, HC and BL PV arrays were used to extract the data for the respective configurations. A module which is partially shaded is denoted by a value of 1 and assigned a very low irradiance compared to an unshaded module, which is denoted by a value of 0. The irradiance assigned to a partially shaded module is a value drawn from a uniform distribution between 50 W/m² and 500 W/m² whereas the irradiance assigned to an unshaded module is a value drawn from a uniform distribution between 500 W/m² and 1000 W/m² for that particular irradiance profile. In this simulation, each and every panel is given irradiance and temperature values as inputs. The temperature considered was a constant of 27 degrees centigrade for all the simulations.

Figure 5:
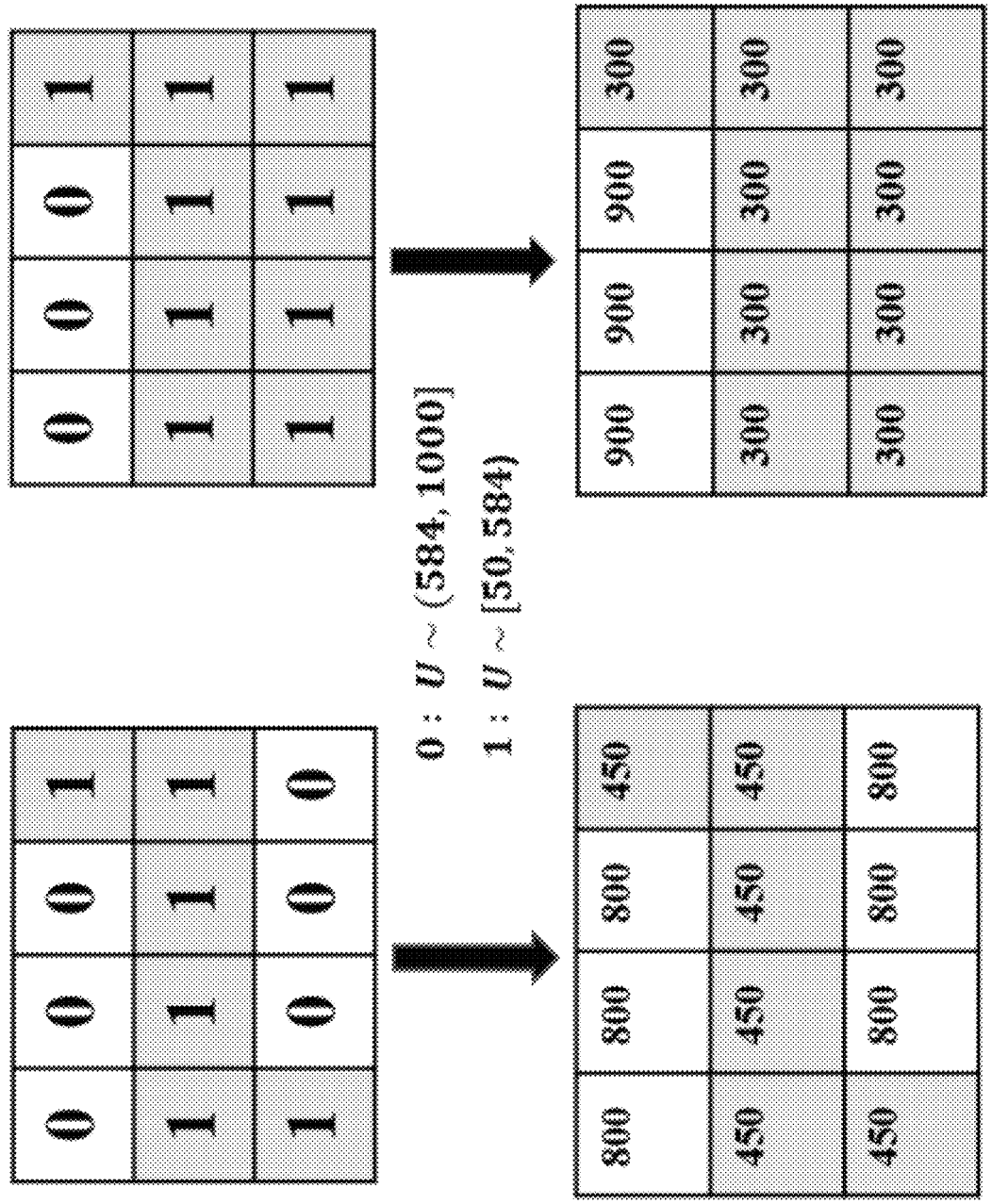
FIG. 5 shows an example of a binary mapping scheme used to generate synthetic data for training the neural network.

In the present disclosure, synthetic irradiance values for every panel of the 3×4 array are generated using a binary mapping rule as depicted in FIG. 5. By assigning '0' to a panel that is unshaded and '1' to a shaded panel, a maximum of 2¹² =4096 irradiance profiles were generated. The irradiance values (irr) associated with the binary numbers are such that they are drawn from the following uniform distribution:

$0 \rightarrow irr \sim \mathcal{U}[\alpha, 1000]$
$1 \rightarrow irr \sim \mathcal{U}[50, \alpha)$ where $\alpha$=584 W/m2 indicates the threshold chosen for considering whether a panel is shaded or not. In other words, all the unshaded and shaded panels receive the same respective irradiance values for a given binary assignment.

Therefore, the effective dataset size increases to 4096×k. Here k=5 and thus 20480 examples of partial shading scenarios are generated. Since some of the irradiance profiles generated based upon the binary mapping rule produced very similar power outputs for the four configurations, only 16240 irradiance profile instances are used and the rest are not considered for further processing.

These synthetic irradiance values were fed as inputs to the Simulink model. The irradiance profiles theoretically cover a wide range of partial shading scenarios. In the present system, the topology reconfiguration is considered to be a supervised learning problem which in turn requires a completely labeled dataset (X, y) where X is the irradiance profile instances of dimension (m×n) where m=16240 and n=12, and y is the associated label vector. Each of the 12 irradiance features corresponds to the irradiance of every panel in the 3×4 PV array.

The SP, TCT and BL Simulink models are executed for the different irradiance profiles and the overall maximum power is computed. The label vector y is generated by passing every irradiance instance from X at a constant temperature of 27° C. to the MATLAB-Simulink 3×4 SP, BL, TCT and HC PV arrays and comparing the maximum powers generated. Therefore, $$y_i = \underset{i}{\mathrm{argmax}} P_i$$

In order to generate a more comprehensive dataset that covers a wider set of shading conditions, for every binary assignment, the considered uniform distribution is sampled k times. This produces k examples for every binary mapping where $P_1=P_{SP}$, $P_2=P_{BL}$, $P_3=P_{HC}$ and $P_4=P_{TCT}$ are the Global Maximum Power Points (GMPP) for the topologies. Since the GMPPs of the topologies can be similar at certain irradiance profiles, samples from X leading to an effective number of samples m=16250 can be ignored.

The Simulink model only considers the shading losses into account. In order to understand the effect of switching losses during reconfiguration, those losses are modeled as a single resistor between each of the wires. It is assumed that MOSFET switches are used for every panel with RON=0.1Ω. A tolerance of +0.017Ω is considered for every wire. Therefore the resistances between the wires are assigned to be the sum of RON and the tolerance. To generate the GMPPs after introducing the losses, a similar procedure is performed.

The set only consisting of the irradiance features forms the training and test dataset to be fed into the neural network classifier. This in turn produces an end-to-end system which may exploit panel-wise features. The present disclosure assumes ideal conditions and does not include the inverter downtime and associated losses.

MLP Architecture

The multi-layer perceptron (MLP) is a feed-forward neural network architecture consisting of several layers with a plurality of neurons in each layer. The input to every neuron in an MLP is a weighted sum of the inputs from the previous layer. The weighted sum at every neuron is passed through an activation function which introduces non-linearities in the network. The weighted sum propagates through the network and the error between the output and actual output label is computed and intended to minimize an overall loss function. The projected error is back-propagated and through the network based upon which the weights at every layer is updated. The training is carried out for a certain number of epochs and is expected to provide satisfactory classification results. The ADAM optimizer was used to minimize the overall log loss function of the network. A neural network at its most basic can be considered to be an adaptive filter whose filter coefficients are updated with the number of iterations.

Deep neural networks have produced state-of-the art performance for a variety of supervisory learning problems even in the PV arena. The present system is implemented using a feed-forward fully connected deep neural network model to perform the topology reconfiguration. Every layer of the neural network performs an affine transformation followed by a non-linear activation φ on the features from the previous layer as given below:

$$h_i = \phi(W_i^T h_{i-1} + b)$$

where $h_{i-1}$ represents the features learned by the i−1th hidden layer, W and b represents the weights and biases respectively. The output label $\hat{y}_i$ is predicted using the softmax layer as given by the following equation.

$$\hat{y}_i = softmax(x_i) = \frac{\exp(x_i)}{\sum_{j=1}^{c} \exp(x_j)}$$

where c=4 represents the number of classes/topologies considered. The specifications of the model are given in Table 1. The dataset was normalized to have zero mean and unit variance. It was divided such that 80 percent of the data was used for training while the remaining 20 percent was utilized for testing. The model trained for 50 epochs optimizes the categorical cross-entropy loss using the ADAM optimizer with a learning rate of $1e^{-3}$.

TABLE I

NEURAL NETWORK MODEL SPECIFICATIONS

| Hidden Layer | No. of Neurons | Activation |
|---|---|---|
| 1 | 32 | tanh |
| 2 | 64 | tanh |
| 3 | 128 | tanh |
| 4 | 256 | tanh |
| 5 | 64 | tanh |
| 6 | 32 | tanh |
| Output Layer | 4 | softmax |

TABLE II

PERCENTAGE OF CASES WHERE $P_{net} > P_{loss}$

| | | Switched Topology | | | |
|---|---|---|---|---|---|
| | | SP | BL | HC | TCT |
| Current Topology | SP | — | 75.30 | 70.75 | 81.52 |
| | BL | 13.8 | — | 17.7 | 22.87 |
| | HC | 14.1 | 32.89 | — | 37.24 |
| | TCT | 12.85 | 3.4 | 10.73 | — |

Experimentation and Preliminary Results

Figure 6:
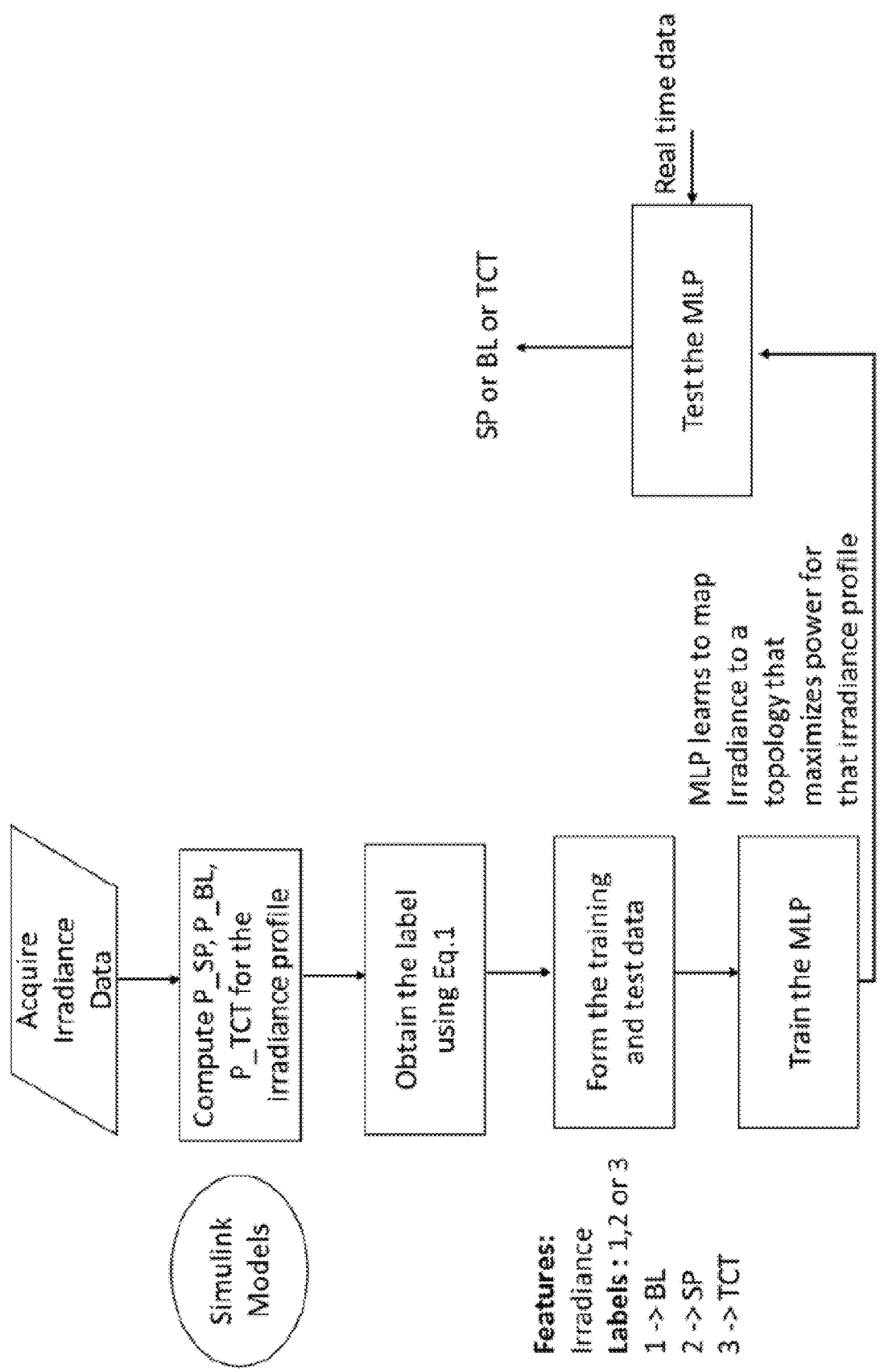
FIG. 6 is a graphical representation showing one embodiment of the overall methodology, involving pre-processing, training and classification.

The overall algorithm is depicted in a flow chart shown in FIG. 6. In the present disclosure, the multi-layer perceptron is trained with the irradiance instances along with the label for that configuration which provides the maximum power among the possible configurations considered for that irradiance profile. The entire dataset was divided into the training and test set with a ratio of 70:30 respectively. The MLP was trained for a maximum of 100 epochs where the network was completely exposed to the entire training data. The trained MLP was used to provide the classification accuracy on the test dataset. The neural network architecture was simulated in Python using the scikit-learn toolbox and keras tool box.

The disclosed classification method is evaluated on the test dataset using the confusion matrix which provides the class-wise performance measure. FIG. 7 depicts the confusion matrix for the test dataset under ideal conditions. It can be clearly understood that the number of examples that are correctly classified outweighs the examples misclassified which indicates the generalizing capability of our approach. The algorithm was executed with 10 different test splits and the average test accuracy was determined to be ≈93.2%.

FIGS. 8A and 8B illustrate a single example of power improvement with connection reconfiguration from series parallel to total cross tied. It was also found that the overall average power increase was 8.2% for the different irradiance profiles indicating the effect and importance of topology reconfiguration.

In conclusion, a PV array topology reconfiguration algorithm that maximizes the power output using neural networks is disclosed herein. The network chooses one among the three topologies, namely SP, BL, HC and TCT, that will optimally maximize power for a given irradiance profile falling on the PV panels. The use of neural nets allows the process of learning to map irradiance inputs to the topology that maximizes power. An overall classification accuracy of 93% was obtained from the simulated model indicating that a machine learning model can be used for topology reconfiguration. An average power improvement of 8.2% was computed illustrating the importance of PV array reconfiguration using machine learning techniques.

In addition to the analysis under ideal conditions, numerical analysis for PV array reconfiguration under switching losses is provided. A number of cases is determined where reconfiguring from one (current) topology to another (switched) topology for that irradiance profile produces a power improvement (Pnet) greater than the switching losses to reach that final topology (Ploss). For example, by assuming SP to be the initial topology, examples where BL namely the final topology produces maximum power. Using the MPPs simulated under switching losses, the powers Pnet and Ploss are found for every irradiance profile and count the number of cases where the inequality is satisfied. Every element of Table II is obtained in this mentioned manner. It can be understood from Table II that reconfiguration is comparatively more effective when the current topology is SP. Although the net power improvement can be lower than the losses incurred for some cases, optimizing the topology using neural networks for the remaining cases can lead to significant power improvements.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for reconfiguring a topology of a photovoltaic array, the system comprising:
    a photovoltaic array, the photovoltaic array comprising a plurality of photovoltaic panels, wherein a connection topology of each of the plurality of photovoltaic panels of the photovoltaic array is operable for dynamic configuration; and
    a processor in operative communication with the photovoltaic array, wherein the processor is operable for executing a set of instructions including:
        measuring a set of irradiance features from the photovoltaic array; and
        processing the set of irradiance features using a neural network, wherein the neural network is operable for determining an optimal connection topology based on the set of irradiance features such that a power output of the photovoltaic array is maximized.

2. The system of claim 1, wherein the processor is operable for executing instructions further comprising:
    communicating the optimal connection topology to the photovoltaic array.

3. The system of claim 1, wherein each of the plurality of photovoltaic panels comprises one or more switches such that a connection between each of the plurality of photovoltaic panels and each of a plurality of adjacent photovoltaic panels are enabled or disabled based on the optimal connection topology determined by the neural network.

4. The system of claim 3, wherein the one or more switches are embodied as smart monitoring devices.

5. The system of claim 1, wherein the neural network is trained using a training dataset and wherein the training dataset is labeled such that each set of irradiance features of the training dataset correlates with a label and wherein the label is indicative of the optimal connection topology for the set of irradiance features.

6. The system of claim 5, wherein the neural network is trained using a training dataset, wherein the training dataset is comprised of synthetic data.

7. The system of claim 1, wherein the neural network comprises a plurality of layers and wherein each of the plurality of layers are connected in series such that an input to each layer of the plurality of layers is an output of a previous layer of the plurality of layers.

8. The system of claim 7, wherein each layer of the plurality of layers of the neural network applies an affine transformation to the input such that a set of latent features is produced as input from each layer of the plurality of layers of the neural network.

9. The system of claim 8, wherein a softmax layer predicts a label which correlates with the set of irradiance features based on the sets of latent features, wherein the label corresponds with the optimal connection topology for the photovoltaic array.

10. The system of claim 7, wherein each layer of the plurality of layers of the neural network applies an activation function to the input such that a set of latent features is produced as input from each layer of the plurality of layers of the neural network.

11. The system of claim 10, wherein the activation function takes as input the set of latent features produced by the previous later, wherein the set of latent features is combined with a weighting vector and a bias value.

12. The system of claim 1, wherein the measured set of irradiance features comprises an irradiance profile, and wherein the irradiance profile is representative of the power output per unit area of each photovoltaic panel.

13. A method for reconfiguring a connection topology of a photovoltaic array, the method comprising:
    providing a photovoltaic array, wherein a connection topology between a plurality of panels of the photovoltaic array is operable for dynamic configuration;
    measuring a set of irradiance features from the photovoltaic array, wherein the set of irradiance features are representative of observed shading conditions of the photovoltaic array;
    processing the set of irradiance features using a neural network, wherein the neural network comprises a plurality of layers and wherein the neural network is operable for determining an optimal connection topology based on the set of irradiance features which maximizes a power output of the photovoltaic array; and
    instructing the photovoltaic array to reconfigure the connection topology between the plurality of panels to the optimal connection topology determined by the neural network.

14. The method of claim 13, further comprising:
    training the neural network using a training dataset, wherein the training dataset is generated using binary mapping and sampled a plurality of times.

15. The method of claim 13, further comprising:
    training the neural network using a training dataset, wherein the training dataset comprises a set of irradiance features and wherein each of the set of irradiance features correlates to a label, wherein the label is indicative of an optimal connection topology which maximizes the power output of the photovoltaic array.

16. The method of claim 13, wherein the step of processing the set of irradiance features using the neural network further comprises:
    processing the set of irradiance features using each layer of the plurality of layers of the neural network, wherein each layer of the plurality of layers applies an affine transformation and an activation function to the set of irradiance features such that a set of latent features is produced by each layer of the plurality of layers of the neural network; and
    processing the updated set of latent features using a softmax layer of the neural network such that a label is predicted based on the updated set of latent features, wherein the label corresponds with the optimal connection topology.

17. The method of claim 16, wherein each layer of the plurality of layers of the neural network applies a non-linear activation function to the set of irradiance features or the sets of latent features.

18. The method of claim 16, wherein each layer of the plurality of layers of the neural network applies an affine transformation to the set of irradiance features or the sets of latent features.

19. The method of claim 16, wherein each layer of the plurality of layers is connected in series such that each layer of the plurality of layers takes the output of the previous layer of the plurality of layers as input.

20. A method for training a neural network to identify a connection topology for a photovoltaic array, comprising:
- generating a training dataset comprising a plurality of synthetic irradiance values for each of a plurality of photovoltaic panels using a binary mapping rule; and
- generating a label vector for each of the plurality of synthetic irradiance values by passing each synthetic irradiance value through a simulation module, wherein the simulation module simulates a photovoltaic array topology for each of the synthetic irradiance values and wherein the label vector corresponds with the photovoltaic array topology which produces a maximal amount of power.

\* \* \* \* \*